April 14, 1925.
C. W. SVENSON
SPEEDOMETER
Filed Nov. 24, 1923
1,533,674
2 Sheets-Sheet 1
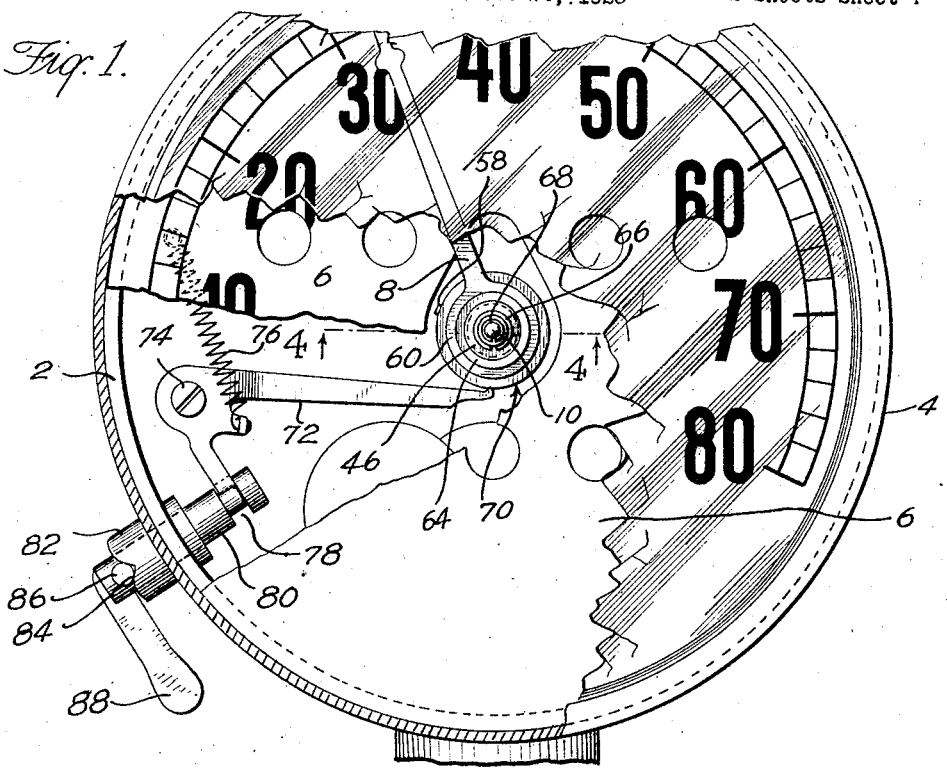
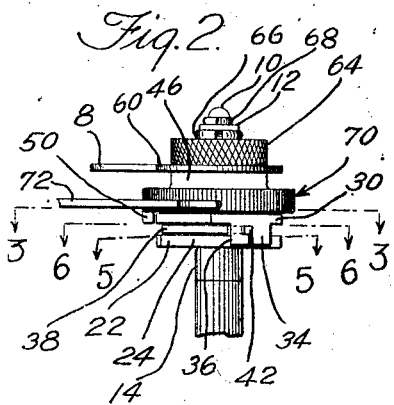
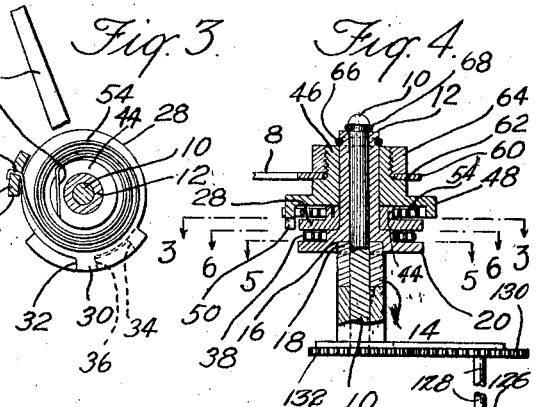
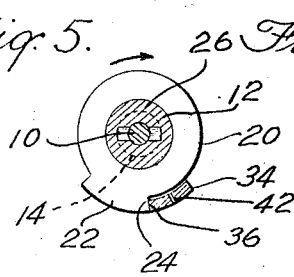
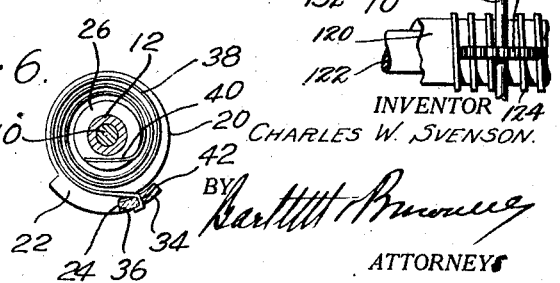
INVENTOR
CHARLES W. SVENSON.
BY
ATTORNEYS April 14, 1925.

C. W. SVENSON 1,533,674

SPEEDOMETER

Filed Nov. 24, 1923

INVENTOR
CHARLES W. SVENSON.
BY
ATTORNEYS

Patented Apr. 14, 1925.

1,533,674

UNITED STATES PATENT OFFICE.

CHARLES W. SVENSON, OF NEW BRITAIN, CONNECTICUT.

SPEEDOMETER.

Application filed November 24, 1923. Serial No. 676,738.

*To all whom it may concern:*

Be it known that I, CHARLES W. SVENSON, a citizen of the United States, residing at New Britain, county of Hartford, State of Connecticut, have invented a certain new and useful Improvement in Speedometers, of which the following is a full, clear, and exact description.

My invention relates to indicating devices and has special reference to such devices and for indicating and recording the speed of a machine part or other moving body.

An object of the invention is to provide a novel and improved device of this character which is particularly useful on police motor cycles.

Another object of the invention is to provide a device of this character in which means under the control of the operator is provided for holding a speed indicating member of the device in any position to which it may be moved, independently of the continued operation of the actuating means for said member at an increased speed.

Another object of the invention is to provide a device of this character in which a speed indicating member thereof is movable in opposite directions in accordance with variations in the speed of operation of the actuating means therefor, and means under the control of the operator is provided for holding said member in any position moved during any continued operation of said actuating means so as to record the indication of the speed at any given instant.

The following is a description of my invention reference being had to the accompanying drawings, in which, Figure 1 is a face view, partly in section and partly broken away, of a speedometer embodying the features of the invention in their preferred form;

Fig. 2 is a detail side elevation of the indicating hand and the mounting therefor illustrated in Fig. 1;

Fig. 3 is a sectional view, partly in plan, taken on the line 3—3 of Figs. 2 and 4;

Fig. 4 is a sectional view taken on the line 4—4 of Fig. 1 and showing conventionally an actuating means employed for the hand-staff;

Fig. 5 is a sectional view taken on the line 5—5 of Figs. 2 and 4;

Fig. 6 is a sectional view taken on the line 6—6 of Figs. 2 and 4;

Figure 7:
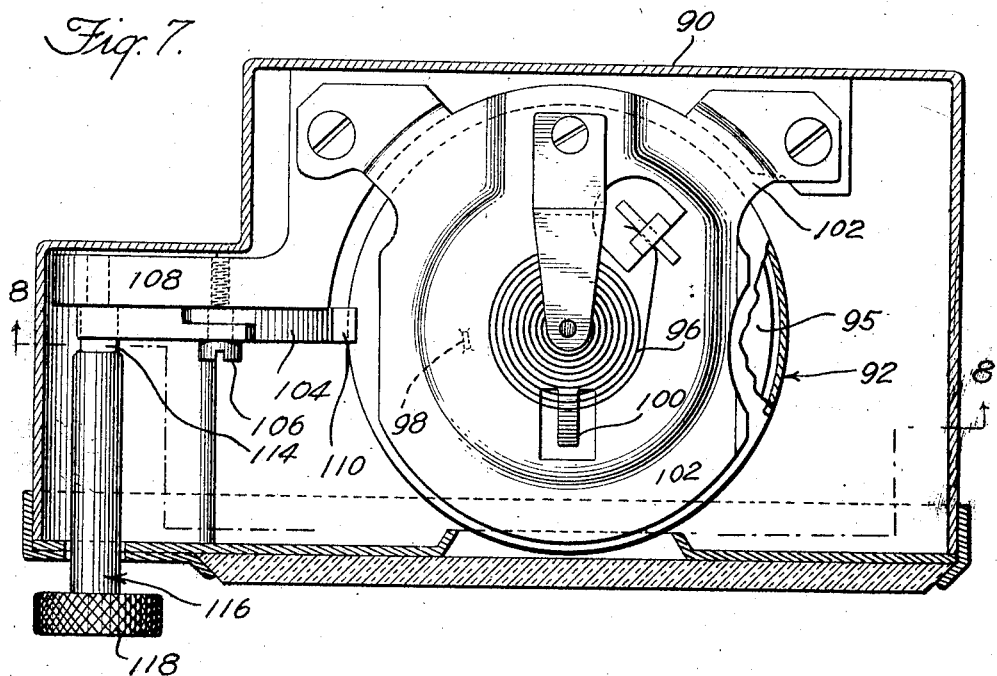
Fig. 7 is a sectional elevation of a speedometer of the magnetic type embodying another form of my invention.

The speedometer illustrated in Fig. 1 of the drawings, which is of the well known positive drive centrifugal type, is provided with a casing 2, a dial cover 4, a dial 6, a speed indicating hand 8, and a hand staff 10. In the illustrated construction the indicating hand is so connected with the hand staff that the hand is caused to move with the staff under normal conditions, but at the will of the operator may be stopped in any position moved independently of the continued movement of the hand staff in either direction. As shown, this connection between the indicating hand and staff comprises a sleeve 12 which is slipped over the end of the staff and caused to turn therewith by means of a tongue and slot connection with a sleeve 14 secured on the staff by a driving fit, the inner end of the sleeve 12 being provided with a slot 16 that receives a tongue 18 on the upper end of the sleeve 14 so that the sleeve 12 and all parts carried thereby can be separately assembled and applied to the shaft 10 or removed therefrom as a unit. The lower end of the sleeve 12 is provided with a flange 20 having a sectoral projection 22 that provides a shoulder 24. The sleeve 12 is further provided with an annular shoulder 26 spaced a slight distance from the flange 20 and against which is held a coupling disk 28 that is mounted for rotary movement on the sleeve 12. The coupling disk 28 is provided with a sectoral projection 30 forming a shoulder 32, and this projection is provided with an inwardly extending projection 34 forming a shoulder 36. A spiral spring 38 is arranged between the coupling disk and the flange 20, and has one end secured in a slot 40 in the sleeve 12 and its other end secured in a slot 42 in the projection 34, the spring being so coiled as to tend to maintain the shoulders 24 and 36 of the sleeve 12 and the coupling disk 28 in engagement but permit them to separate if the member 20 is moved clockwise while the member 28 is held stationary. The coupling disk 28 is further provided with a spacing hub 44 against the end of which is held a hub or sleeve 46 which is mounted for rotary movement on the upper end portion of the sleeve 12. The hub or sleeve 46 is provided with an inwardly projecting flange 48 which has an inwardly extending sectoral projection 50 forming a shoulder 52. A spiral spring 54 is located between the hub or sleeve 46 and the coupling disk 28 and has one end secured in a slot 56 in the hub of the coupling disk and its other end secured in a slot 58 in the flange 48 of the sleeve, the spring being so coiled as to tend to relatively turn the sleeve and disk to maintain the shoulders 52 and 32 in engagement but permit them to separate if the member 28 is moved counter-clockwise while the member 46 is held stationary. The hub or sleeve 46 carries an indicating hand 8, the hand being provided with an enlarged annular inner end 60 which is slipped over the reduced outer end of the sleeve 46 and is clamped in position against a shoulder 62 on the sleeve by means of a nut 64. The hand carrying sleeve 46 and the coupling disk 28 are held from axial movement on the sleeve 12 by means of a wire washer 66 which is received in a groove in the end of the sleeve 12 and abuts the end of the hand carrying sleeve 46. The sleeve 12 is held on the staff 10 by means of a wire washer 68 which is received in a groove in the end of the staff and abuts the end of said sleeve.

From the foregoing it will be apparent that as the shoulders 24 and 36 are held in engagement by their associated spring 38, and the shoulders 52 and 32 are held in engagement by their associated spring 54, the speed indicating hand, when free to move, will be caused to turn with the hand staff so as to indicate the various speeds of travel of the moving body to which the speedometer is applied. In the illustrated construction, however, means under the control of the operator is provided for rendering the connections with the hand carrying staff ineffective to turn the hand and for holding the hand in any position moved. To provide for this the hand carrying hub or sleeve 46 is provided with a surface portion 70 having teeth knurled or milled therein which are adapted to be engaged by the end of an arm on a bell crank lever 72, the end of the arm being shaped to fit the teeth. The bell crank lever is pivotally mounted on a screw 74 on the speedometer casing, and is urged in a direction to hold the end of its arm in engagement with the knurled teeth on the sleeve 46 by means of a coiled spring 76 having one end connected with the lever and its other end secured to the speedometer casing. The end of the other arm of the bell crank lever 72 is received in an annular groove 78 in the inner end of a plunger 80 which extends through an aperture in a sleeve 82 on the cylindrical wall of the speedometer casing. The outer end surface of the sleeve 82 is provided with beveled surface portions 84 that are adapted to be engaged by a pin 86 on the outer end of the plunger 80. The outer end of the plunger 80 is further provided with a laterally projecting handle 88 for manually rotating the same.

With the parts in the positions shown in Fig. 1, the spring 76 holds the end of the inner arm of the bell crank lever 72 in holding engagement with the teeth on the hand carrying sleeve 46. When it is desired to retract the lever 72 from the knurled surface 70 of the sleeve 46, a quarter turn is given to the plunger 80 which causes the pin 86 to ride up on one of the bevel surfaces 84 and thereby retract the plunger and turn the lever 72 in a direction to move its end out of engagement with said knurled surface 70 of the sleeve. It will be apparent that during the normal operation of the speedometer the holding lever 72 is held out of engagement with the hand carrying sleeve 46 so as to enable the indicating hand to turn with the staff 10 to indicate the various speeds, as above described.

When it is desired to indicate or register at any particular time the speed of the moving body to which the speedometer is applied, the driver or operator turns the plunger 80 to a position shown to enable the spring 76 to move the holding lever 72 into holding engagement with the teeth on the hand carrying sleeve 46, whereupon the indicating hand is stopped in the position it is at that time and is held from movement in either direction, the yielding connection between the hand carrying sleeve 46 and the staff 10 enabling the staff to be turned in either direction through its connection with the moving body independently of the indicating hand. In Figs. 1 to 6, inclusive, the indicating hand and the parts associated therewith are shown in the position they assume when the hand is held in a position indicating between thirty and thirty-five miles, and the hand carrying staff 10 has been returned to its zero position. It may be noted that when the hand is thus held and the staff 10 moves toward its zero position, the staff positively acts through the shoulders 24 and 36 to carry the coupling disk 28 therewith and to tension the spring 54 associated with the coupling disk and hand carrying sleeve 12, said spring permitting this movement of the disk independently of the hand carrying sleeve. In case the speed of the moving body is increased after the indicating hand is held by the holding lever 72, the shoulders 32 and 52 on the coupling disk 28 and hand carrying sleeve 46 will remain in engagement while the spring 38 associated with the coupling disk and sleeve 12 will be tensioned by the rotation of the staff 10, the spring 38 permitting movement of the staff 10 and sleeve 12 independently of the coupling disk 28 and hand carrying sleeve 46. In case the holding lever 72 is disengaged from the hand carrying sleeve 46 after the staff 10 has been returned to its zero position, the spring 54 associated with said sleeve will immediately act to return the indicating hand to its zero position, the position of the hand being positively determined with relation to the staff by the engagement of the stop shoulders 24 and 36, and 32 and 52. In case the holding lever 72 is disengaged from the hand carrying sleeve 46 when the moving body is traveling at a greater or less speed than the speed indicated by the hand before the latter is released, the spring 38 associated with the sleeve 12 and the coupling member 28 will immediately act to return the parts of the yielding connection to their normal position with relation to the staff 10 and thus permit the hand to move with the staff and indicate the actual speed at that moment.

From the foregoing it will be apparent that under normal conditions the indicating hand 8 will move in unison with the staff 10 to indicate the various speeds of the moving body; that by merely turning the plunger 80 the operator may stop the hand in the position moved at any time and the hand will be held in that position until the plunger 80 is again turned to release the hand irrespective of whether the speed of the moving body is increased or decreased after the stopping of the hand; and that immediately upon releasing the hand it will return to its initial position with relation to the hand staff 10 so as to function in the usual manner as a speed indicating hand.

It may be noted that the speedometer, above described, is particularly adapted for use on police motor cycles, for the reason that the policeman upon driving up alongside of an automobile or other vehicle by merely setting the holding lever so as to permit it to engage the knurled surface 70 is enabled to register the speed of the vehicle at that time, the indicating hand remaining in the position moved until the holding lever is withdrawn even though he increases the speed of his motor cycle to get in front of and to stop the car.

In actual use an additional hand, rigidly mounted on the shaft 10 for indicating the actual speed of the moving body when the hand 8 is locked in position preferably is not made a part of the present embodiment. Such a hand would indicate the actual speed at all times but is preferably omitted on account of the confusion that might result from the presence of two hands.

My invention may also be embodied in speedometers in which the indicating members are not driven by a positive mechanical connection among which are the well known magnetic induction speedometers.

Figure 8:
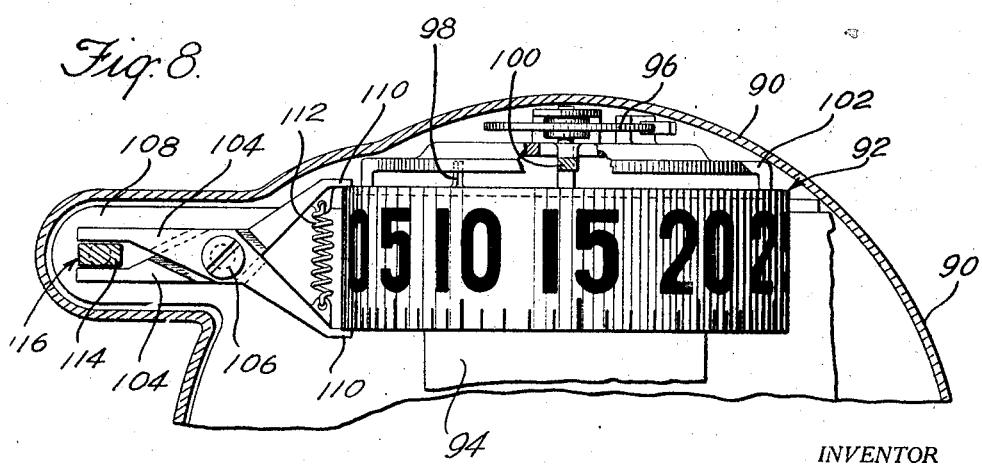
Fig. 8 is a sectional elevation taken on the line 8—8 of Fig. 7.

The speedometer illustrated in Figs. 7 and 8 of the drawings is of a magnetically operated induction type having a casing 90, a cylindrical shaped dial or indicating member 92, a rotating member 94 that carries a magnet 95 acting inductively for operating the dial, and a spiral spring 96 tending to turn the dial toward its initial or zero position, the zero position of the dial being determined by the engagement of a stop 98 thereon with a fixed stop 100 on a support member 102. In this type of speedometer the indicating member can be stopped in any position without interfering with the continued rotation of the magnet, since there is no mechanical connection between the indicating member and the magnet.

In this construction the dial holding means comprises two levers 104 that cross each other and are pivotally mounted on a cap screw 106 secured in a bracket member 108. The inner ends of the levers 104 are provided with jaws 110 which are adapted to move toward each other to clamp the dial between them by means of a coiled spring 112. The outer ends of the levers 104 extend over a flattened cam portion 114 of a stud 116 having its inner end mounted for turning movement in an aperture in the bracket member 108 and having its outer end provided with a handle or knob 118. With the jaws in clamping engagement with the dial, as shown in Figs. 7 and 8, the dial is held from movement against the drag of the rotating magnet so as to register the speed of the moving body at the time the jaws are brought into engagement with the dial. To restore the dial to the action of the magnet, the stud 116 is given a quarter turn which causes the cam to spread the jaws 110 so as to release the dial.

Any suitable and well known means may be employed for connecting the hand-staff 10 with the moving body. In Fig. 4 such actuating means for the hand-staff is indicated which, as shown, comprises a sleeve 120 that is mounted upon a shaft 122, the sleeve being connected to rotate with the shaft and being movable longitudinally of the shaft. This shaft 122 is adapted to be connected so as to cause the sleeve to be rotated in accordance with the speed of the moving body, and the sleeve is adapted to be connected with a centrifugal governor or other suitable means to cause it to be shifted longitudinally on its shaft 122 varying distances in accordance with the speed of rotation thereof. The sleeve is provided with a series of circular rack teeth 124 which engage a pinion 126 secured on the lower end of a shaft 128, the upper end of the shaft being connected to gears 130 and 132 with the hand-staff 10, the gears being secured on the shaft 128 and hand-staff, respectively. With such a construction it will be apparent the sleeve will act through its connection with the hand-staff to turn said staff in accordance with the speed of rotation thereof, and hence in accordance with the speed of the moving body.

Except as defined in the claims, my invention is not limited to use in any particular type of speedometer, as it may be used in various types of speed indicating devices in addition to the two illustrated in the drawings.

What I claim is:

1. A speedometer having, in combination, a speed indicating member, actuating means therefor, and manually controllable means for holding said member from movement in either direction during the continued operation of said actuating means at a higher or lower speed.

2. A speedometer having, in combination, a speed indicating member, actuating means therefor, and manually controllable means for holding said member in a fixed position independently of the continued operation of said actuating means at an increased speed.

3. A speedometer having, in combination, a speed indicating member, actuating means for moving said member in opposite directions in accordance with variations in the speed of operation of said actuating means, and manually controllable means for rendering said actuating means ineffective to move said member and for holding said member in a fixed position during the continued operation of said actuating means.

4. A speedometer having, in combination, a speed indicating member, actuating means therefor including a yielding connection therewith adapted to move said member in either direction, and manually controllable means for holding said member from movement in either direction by said yielding connections.

5. A speedometer having, in combination, an indicating hand, a hand staff, suitable connections between said hand and staff for moving said hand upon movement of said staff, and manually controllable means for rendering said connections inoperative to move said hand in either direction and for holding said hand in fixed position.

6. A speedometer having, in combination, an indicating hand, a hand staff, a yielding connection between said hand and staff for causing said hand to move with said staff in either direction, and a manually controllable device for holding said hand from movement in either direction during the continued movement of said staff.

7. A speedometer having, in combination, an indicating member, an indicating member staff, said member and staff having cooperative stops associated therewith, respectively, for moving said member when said staff is turned in one direction, and a second set of cooperating stops associated therewith, respectively, for moving said member when said staff is turned in the opposite direction, and springs associated with said two sets of stops, respectively, tending to hold said stops in engagement, and manually controllable means for holding said indicating member from movement when desired.

8. A speedometer having, in combination, an indicating hand, a hand staff, and connections between said hand and staff constructed and arranged so as to cause said hand to be turned in opposite directions upon turning said staff in opposite directions, respectively, and to enable said hand to be held from movement in either direction during the movement of said staff, and manually controllable means for thus holding said hand from movement.

9. A speedometer having, in combination, an indicating hand, a hand staff, a hub on which the hand is secured mounted for rotation about said staff, and connections between said staff and hub constructed and arranged so as to cause said hand to be turned in opposite directions upon turning said staff in opposite directions, respectively, and to enable said hand to be held from movement in either direction during the movement of said staff, and manually controllable means for thus holding said hand from movement comprising a member adapted to be brought into and out of holding engagement with said hub.

10. A speedometer having, in combination, an indicating member, an indicating member staff, said member and staff having cooperating stops associated therewith, respectively, for moving said member when said staff is turned in one direction, and a second set of cooperating stops associated therewith, respectively, for moving said member when said staff is turned in the opposite direction, and springs associated with said two sets of stops, respectively, tending to hold said stops in engagement and manually controllable means for holding said indicating member from movement when desired, said stops, springs and member being removable as a unit from said staff.

11. A speedometer having, in combination, a casing, a speed indicating member, actuating means therefor, and means operable by the operator from the outside of the casing for holding said member from movement in either direction during the continued operation of said actuating means at varying speeds.

CHARLES W. SVENSON.